United States Patent [19]

Byers, Jr.

[11] 3,920,034

[45] Nov. 18, 1975

[54] PROPORTIONAL BYPASS VALVE HAVING VARIABLE AREA ORIFICE CONTROL MEANS

[75] Inventor: James Otto Byers, Jr., Racine, Wis.

[73] Assignee: Tomco, Inc., Racine, Wis.

[22] Filed: May 7, 1973

[21] Appl. No.: 358,037

[52] U.S. Cl. ................................. 137/116; 60/427
[51] Int. Cl.² ........................................ G05D 11/00
[58] Field of Search ...... 137/115, 116, 118, 596.13; 251/35; 60/427

[56] References Cited
UNITED STATES PATENTS

| | | | |
|---|---|---|---|
| 2,474,772 | 6/1949 | Ashton | 137/116 X |
| 2,905,191 | 9/1959 | Vander Kaay | 137/116 X |
| 3,307,568 | 3/1967 | Gartner | 137/115 |
| 3,411,295 | 11/1968 | Byers, Jr. | 60/427 |
| 3,723,025 | 3/1973 | Coakley | 137/116 X |

*Primary Examiner*—William R. Cline
*Attorney, Agent, or Firm*—Ronald E. Barry

[57] ABSTRACT

A proportional bypass valve having a valve spool positioned in a bore in the valve for controlling the flow of fluid between the inlet port and outlet port, the spool having an axial passage and being biased by a spring to a neutral position and responding to pilot flow for controlling the flow rate between said inlet and outlet port and a variable area orifice operatively associated with said passage in said spool for controlling pilot flow rate and having a predetermined pressure drop for any finite position of the spool, the flow rate between the inlet port and outlet port being in proportion to the pilot flow rate as determined by the bias of said spring.

2 Claims, 10 Drawing Figures

3,920,034

PROPORTIONAL BYPASS VALVE HAVING VARIABLE AREA ORIFICE CONTROL MEANS

BACKGROUND OF THE INVENTION

Hydraulic systems having flow control valves for controlling the supply of fluid to hydraulically actuated devices are generally well-known. A system of this type is shown in my prior U.S. Pat. No. 3,411,295, dated Nov. 19, 1968 and entitled "Hydraulic Supply Systems".

The system disclosed in this patent utilizes a hydraulic wheatstone bridge arrangement and a pressure repsonsive spring biased bypass valve to control the pressure in the system. The bypass valve is connected to respond to the pressure of fluid in both legs of the wheatstone bridge and responds to a pressure differential across the legs that is greater than spring pressure. It should be apparent that the bypass valve operates at less than full pump pressure therefore increasing minimum operating pressures. In this regard, the bypass valve at any position has a percentage of full pump pressure acting at each end of the valve spool and will not operate until there is a differential pressure at each end greater than the spring pressure. At low system pressures, this sometimes low percent of system pressure may be insufficient to operate the valve accurately.

The wheatstone bridge arrangement includes an open connection to tank or a fixed loss in order to maintain a balanced system. Full pump flow is therefore never available to the hydraulically actuated device being controlled.

The bypass valve used in this arrangement includes small fixed orifices at each end in order to control the percentage of pressure acting on the valve. These orifices must be small in order to control the flow lost to tank. These small orifices are easily clogged by small particles carried by the hydraulic fluid. The bypass valve is controlled by a command variable orifice at one end and a feedback variable orifice at the other end. The rate of fluid flow is therefore dependent on a fixed area relation between the variable orifices at each position of the valve spool.

SUMMARY OF THE INVENTION

The hydraulic flow control system of the present invention utilizes a proportional flow control bypass valve which can be used effectively at both high and low pressures to control fluid flow. The pressure available to control the bypass valve is independent of load pressure. The proportional flow bypass valve of this invention is responsive to full pump pressure and therefore allows lower operating pressures at the pump. In one embodiment, the valve completely closes when the system calls for all of the hydraulic fluid under pressure so that full fluid flow is available to the system. In another embodiment, all pilot flow goes to the system at all times. The valve spool is provided with a variable area orifice arranged so that the valve spool position is always determined by the pilot flow rate. The pressure drop across the variable area orifice is substantially fixed and as a consequence the flow rate for each position will always be substantially fixed. Since the spool responds to pilot flow, the variable pilot orifices can be incorporated into any conventional valving system. One embodiment of this invention can be used in a system using commercially available four-way valves, and another embodiment can be used such that all flow goes to the load and only a small part of the total flow must pass across the controlling variable area orifice.

One embodiment of this invention makes it possible to make a poppet type bypass valve, that can be used as a pressure control or relief valve. The poppet type relief valve is superior to sliding types because they open more rapidly.

DESCRIPTION OF INVENTION

Figure 1:
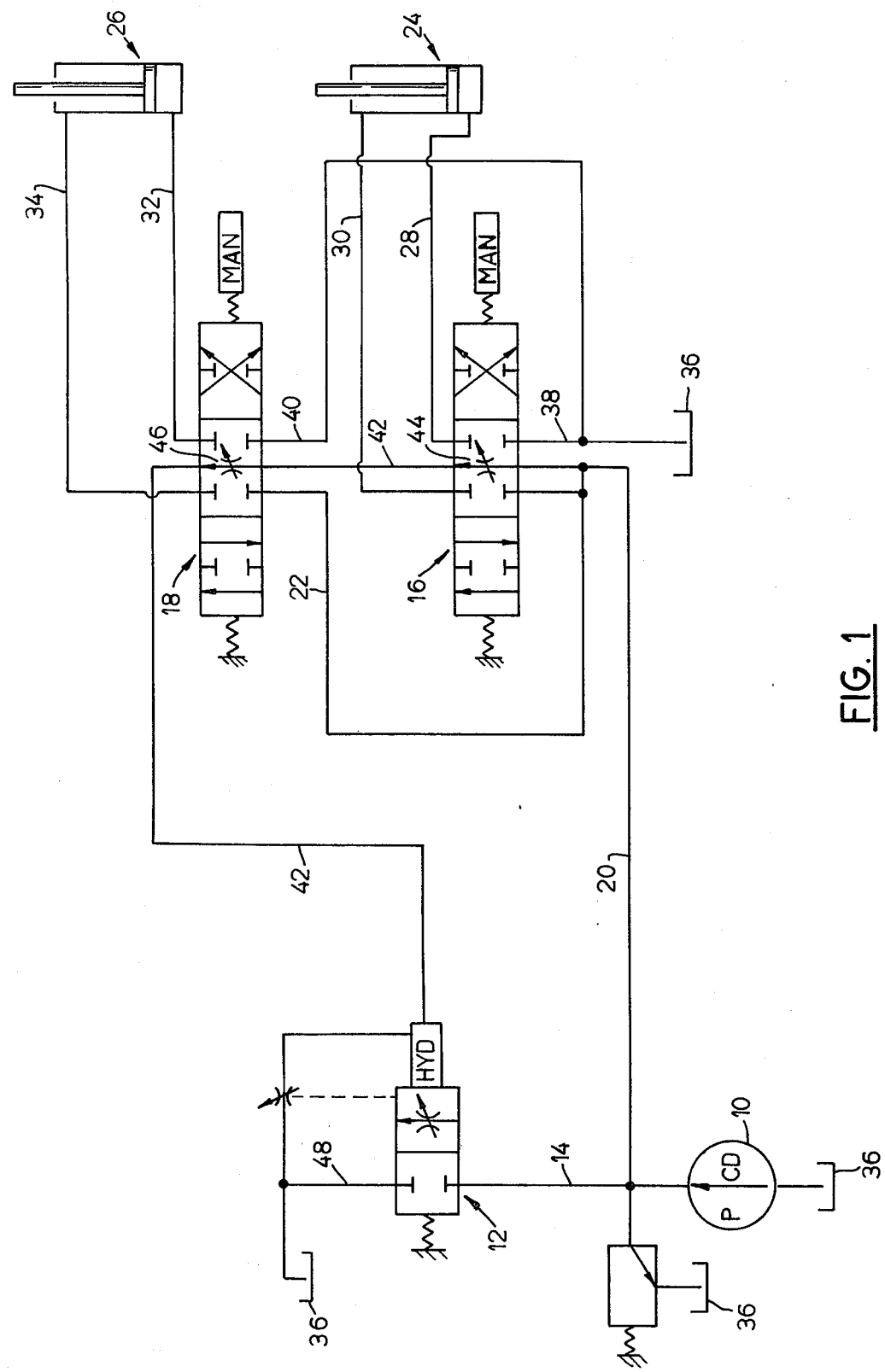
FIG. 1 is a schematic diagram of a hydraulic fluid supply system showing one of the proportional bypass valves in an open center system having the control orifices connected in series.

Referring to FIG. 1, a schematic hydraulic system is shown which includes a fixed displacement pump 10 connected to a proportional bypass valve 12 by a line or conduit 14 and to a pair of four-way open center directional control valves 16 and 18 by lines or conduits 20 and 22, respectively. The directional control valves 16 and 18 are shown connected to control double acting piston and cylinder assemblies 24 and 26, respectively.

In this regard, the piston and cylinder assembly 24 is connected to the valve 16 through lines or conduits 28 and 30. The piston and cylinder assembly 26 is connected to the directional control valve 18 through lines or conduits 32 and 34.

Means are provided for conducting a pilot flow signal from the directional control valves to the bypass valve 12. In this regard, pilot flow from the directional control valves 16 and 18 is carried back to the proportional bypass valve 12 through lines or conduits 42. The directional control valves 16 and 18 are connected to the reservoir 36 by conduits 38 and 40.

When both directional control valves 16 and 18 are in the neutral position, fluid will flow from the pump 10 through conduit 20 to the variable orifices 44 and 46 in the directional control valves 16 and 18, respectively and back to the proportional bypass valve 12 through conduits 42. As pressure due to flow rate builds up in the proportional bypass valve 12, the valve will open to bypass fluid through conduits 14 and 48 to tank 36. If one or the other of the directional valves 16 and 18 are opened, the pilot flow rate in conduit 42 will drop and pressure will increase in conduit 20 until the pressure is equal to the load pressure on cylinders 24 and/or 26. The rate of fluid flow to tank 36 through the proportional bypass valve 12 is controlled by means of a variable area orifice which responds to the flow in the pilot flow line, as more particularly described hereinafter.

Figure 2:
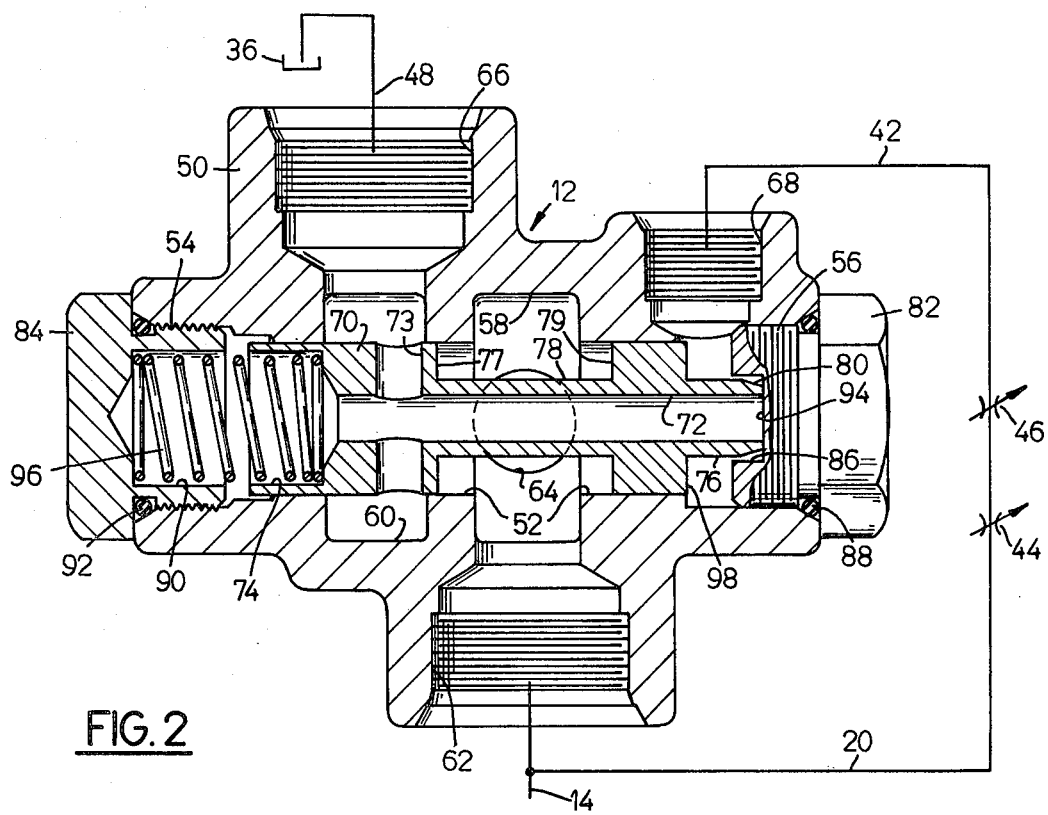
FIG. 2 is a sectional view of one type of proportional bypass valve that can be used in the open center system.
Figure 3:
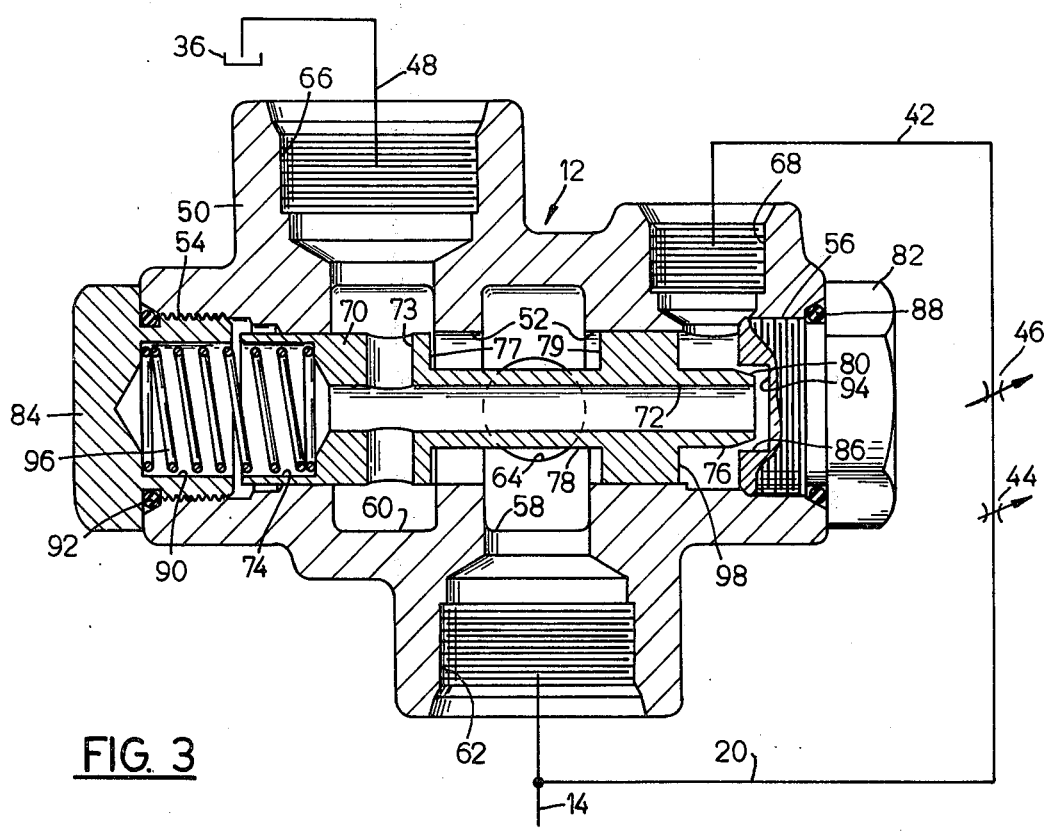
FIG. 3 is a view similar to FIG. 2 showing the spool valve in the open position.

FIGS. 2 and 3

Referring to FIGS. 2 and 3, the proportional bypass valve 12 is shown which can be used in combination with the tandem open center directional control valves as shown in FIG. 1. This bypass valve bypasses fluid to tank whenever the pilot pressure equals the equilibrium or balanced condition of the valve.

The valve 12 includes a casting or housing 50 having a bore 52, a threaded counterbore 54 at one end and a threaded counterbore 56 at the other end of bore 52. Recesses or wells 58 and 60 are provided in the housing 50 at spaced intervals along the bore 52. Primary fluid is admitted to the bore 52 by means of primary fluid flow ports 62 or 64 connected to well 58. Fluid is discharged from the bore 52 by means of discharge port 66 connected to well 60. Pilot fluid is admitted to the bore 52 through pilot port 68 connected to the counterbore 56 at the end of bore 52.

The flow of fluid through the bore 52 is controlled by means of a valve spool 70 which is positioned for axial movement in either direction in the bore 52. The valve spool 70 includes a central passage or bore 72 which terminates at one end in an enlarged counterbore 74. A cross bore 73 is provided at the other end of bore 72. A reduced diameter section 76 is provided at the other end of the spool 70. An annular recess 78 is provided intermediate the ends of the spool 70 to define metering lands 77 and 79 which bridge the recess 58 in the housing 50. The outer periphery of the end of reduced diameter section 76 includes a tapered section 80 which tapers downwardly toward the end of the spool.

The bore 52 is closed at the ends by means of threaded plugs 82 and 84. The plug 82 includes a recess 86 and is sealed therein by means of an O-ring seal 88. The plug 84 includes a recess 90 and is sealed therein by means of an O-ring seal 92.

The flow of fluid through the bore 72 of the valve spool 70 is controlled by means of the variable area orifice formed by the tapered section 80 and the annular recess 86. The recess 86 has a diameter slightly larger than the outer diameter of the reduced diameter section 76 of the spool 70. The end 94 of the recess 86 acts as a valve seat for the end of the spool 70 to close the bore 72. The recess 86 acts as a valve seat for the end of the spool 70 to close the bore 72. The recess 86 cooperates with the tapered section 80 to meter the flow of fluid from the pilot port through the bore 72 in the spool 70.

The valve spool 70 is biased into engagement with the valve seat 94 by means of a spring 96 which is seated in the bore 74 in the end of the spool 70 and in the recess 90 in the threaded plug 84. The bias force of the spring 96 acting on the valve spool 70 determines the initial force required to open the valve.

The valve 12 is normally connected to the fixed displacement pump 10 through one of the inlet ports 62 or 64 with the other of the inlet ports being connected to the hydraulic system. Fluid flow will, therefore, be continuous across the ports 62 and 64 through the recess 58 in the housing 50. The pilot port 68 is connected to the controlled system through the variable orifices 44 and 46 in conduit 42. The tank port 66 is connected directly to tank 36 through conduit 48.

In operation, the valve spool 70 is normally biased to the neutral position with the end of the spool 70 seated against the valve seat 94. Fluid from the pump 10 will flow through the port 62 or 64 directly into the system. The fluid will flow through the throttle valves 44 and 46 and into the pilot port 68 into bore 52.

When the force of the fluid under pressure acting on the cross sectional area of the surface 98 of the valve spool exceeds the force of the spring 96, the valve spool will move to the left. As the spool 70 moves away from the valve seat 94, the fluid will flow through the orifice between the tapered section 80 and the recess 86 through the bore 72 and cross bore 73 through the port 66 to tank 36. An equilibrium condition will be reached when the flow rate through the orifice between the tapered section 80 and the recess 86 is sufficient to maintain a force equal to the force of the spring 96. In this regard, the cross sectional area of the surface 98 times the pressure of the fluid is predetermined by the force of spring 96 and provides a predetermined pressure drop across the orifice formed by tapper 80 and recess 86. When the spool is in equilibrium therefore, each pilot flow rate represents a finite position for spool 70.

As the pressure of the fluid at pilot port increases, the spool 70 will move further to the left opening the orifice between the end of recess 78 and the recess 60 in the housing 50 allowing fluid from the recess 58 to bypass to tank. The flow rate of the bypass fluid will be proportional to the flow rate across the tapered end of the spool.

FIGS. 4, 5, 6 and 7

Figure 4:
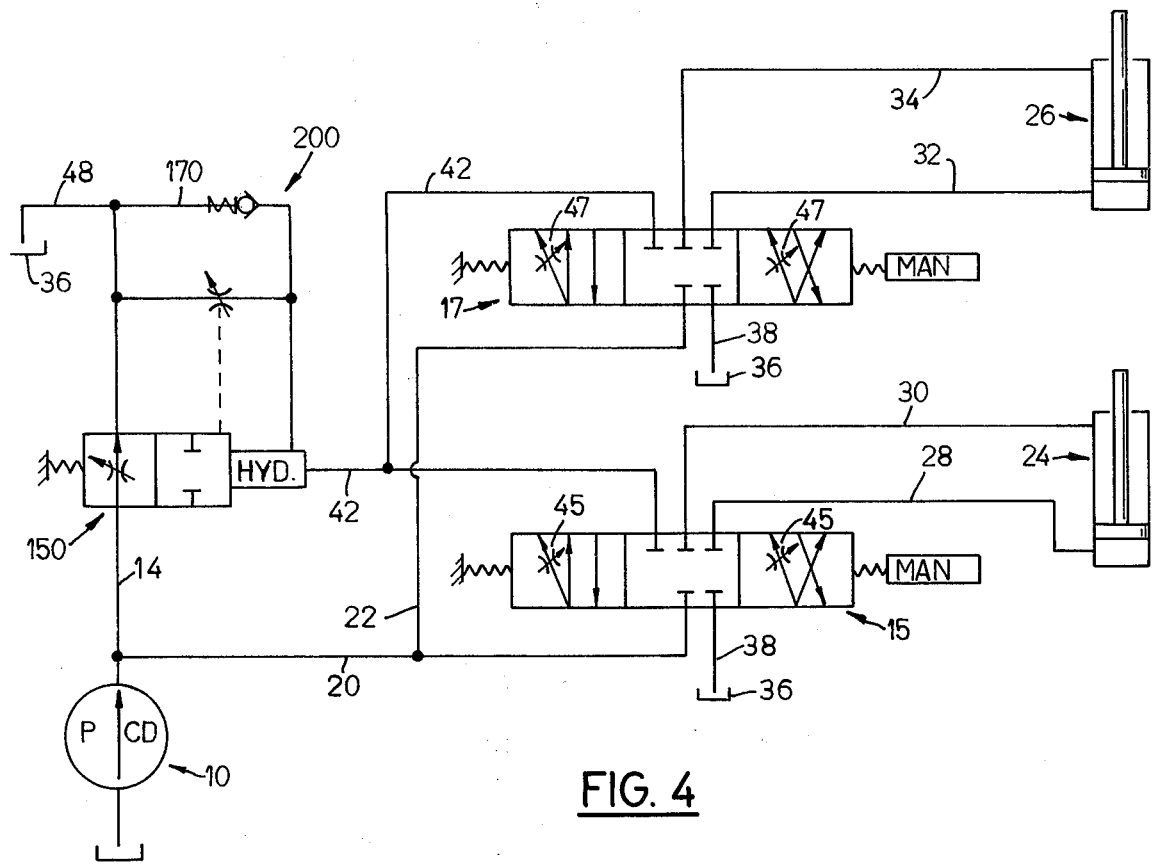
FIG. 4 is a schematic diagram of a hydraulic fluid supply system showing another of the bypass valves in a closed center system having the variable control orifices connected in parallel.

Referring to FIG. 4, a schematic hydraulic system is shown which includes a fixed displacement pump 10 connected to a poppet type bypass valve 150 by a line 14 and to a pair of four-way closed center directional control valves 15 and 17 by lines 20 and 22, respectively. The directional control valves 15 and 17 are shown connected to double acting piston and cylinder assemblies 24 and 26, respectively.

In this regard, the piston and cylinder assembly 24 is connected to control valve 15 by lines 28 and 30. The piston and cylinder assembly 26 is connected to control valve 17 through lines 32 and 34.

Means are provided for conducting pilot fluid from the control valves 15 and 17 to the poppet bypass valve 150. Such means is in the form of return lines or conduits 42. The directional control valves 15 and 17 and the valve 150 are connected to the reservoir 36 by lines 38 and 48, respectively.

When both directional control valves 15 and 17 are in the neutral position, fluid will flow from the pump 10 through lines 14, valve 150 and line 48 to the reservoir 36. If one or both of the directional control valves are actuated, fluid will flow through the variable orifices 45 or 47 to the valve 150. As pressure builds up in line 20 or 22, the pilot flow pressure in line 42 will also increase to gradually close the valve 150 in inverse proportion to the flow rate of pilot fluid, as more particularly described hereinafter.

Figure 5:
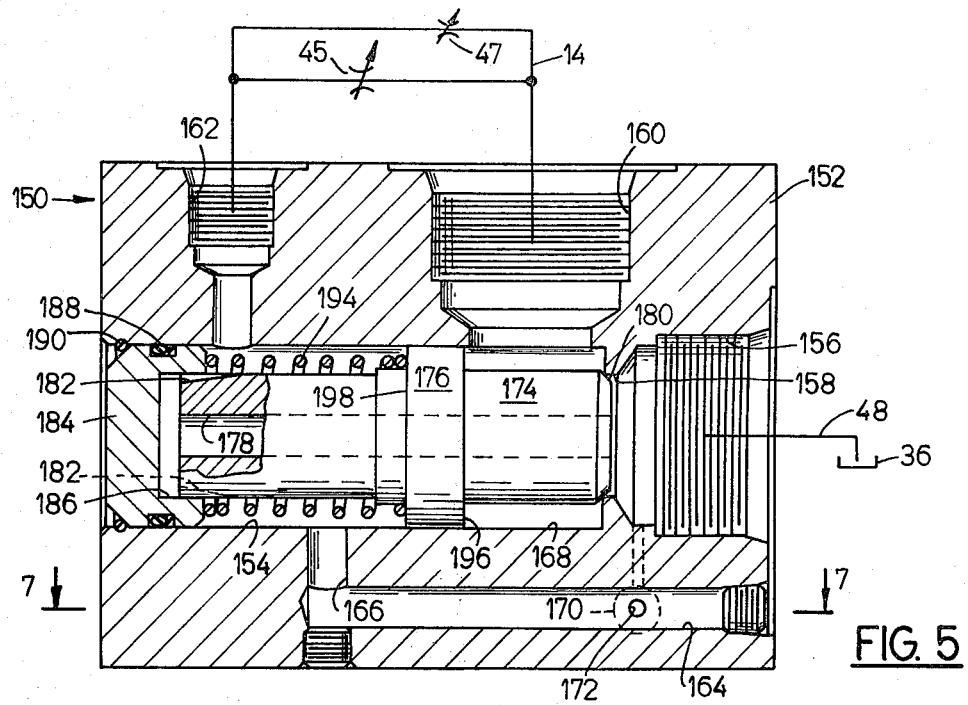
FIG. 5 is a sectional view of the alternate form of proportional bypass valve that can be used in the closed center system of FIG. 4.
Figure 6:
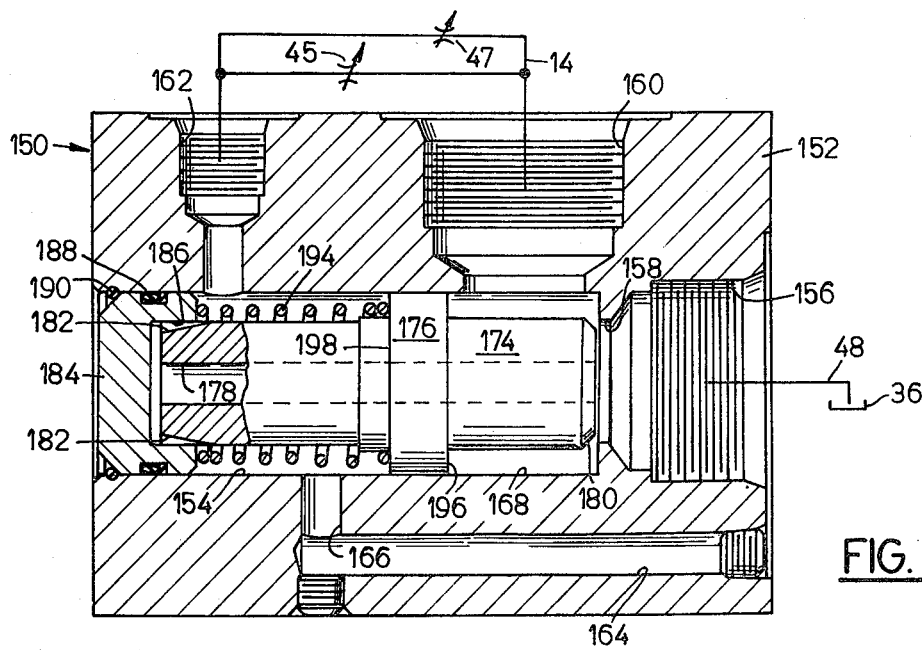
FIG. 6 is a view similar to FIG. 5 showing the valve spool in the open position.

Referring to FIGS. 5 and 6, the proportional bypass valve 150 provides for the bypassing of fluid to tank by means of variable area orifice in inverse proportion to pilot flow. As the orifices 44 and 46 in valves 15 and 17 are opened, pilot pressure will increase closing the valve 150 and opening the variable area orifice means, as more specifically described hereinafter.

In this regard, the valve 150 includes a housing 152 having a bore 154. A threaded section 156 is provided at one end of the bore 154 and a reduced diameter opening 158 is provided inwardly of the threaded section 156. An inlet port 160 and a pilot port 162 are connected to the bore 154. A closed end bore 164 is provided in the housing in a parallel relation to bore 154 and is connected at its closed end to the bore 154 by a port 166. A discharge passage 170 is connected to the bore 164 through an orifice 172.

The flow of fluid through the bore 154 is controlled by means of a spool 174 having a piston head 176 mounted for axial movement in the bore. It should be noted that the cross sectional area 196 of the piston head 176 is substantially equal to the cross sectional area 198 on the opposite side of the piston head 176.

The spool 174 includes an axial passage 178 and has a tapered valve seat 180 located on one end in a position to engage the reduced diameter opening 158 in the bore 154. A pair of slots 182 are provided at the other end of the spool 174. The spool 174 is biased by means of a spring 194 into engagement with the reduced diameter opening 158 in the bore 154.

The bore 154 is closed at the end opposite the threaded section 156 by means of a plug 184 having a cylindrical recess 186. The plug 184 is sealed within the bore 154 by means of an O-ring seal 188 and is retained therein by means of a snap ring 190. The recess 186 has an inner diameter slightly larger than the outer diameter of the end of the spool 174 which is positioned for axial movement within the recess 186. Control of the rate of flow of fluid through the passage 178 is provided by means of the variable orifice formed by the recess 186 in the plug 184 with the slots 182 in the outer surface of the spool 174. In this regard, it should be noted that as the spool 174 moves outwardly from the recess 186, the cross sectional area of the slots 182 will increase allowing for a greater flow of fluid through the slots 182.

The valve 150 is connected to fluid pressure conduit 14 through the port 160. The pilot port 162 is connected to the conduit 42 which includes the variable orifices 45 and 47. The threaded section 156 at the end of the bore 154 is connected directly to tank 36.

In operation, fluid under pressure entering the bore 154 through the port 160 will build up pressure against the cross sectional area 196 of the piston head 176. When the force acting on the piston head equals the bias force of the spring 194, the spool 174 will move to the left opening the orifice between the valve seat 180 and the reduced diameter section 156 and closing the flow path through the slots 182. Fluid will then flow through the valve 150 directly to tank 36 at a pressure determined by the force of spring 194 and area 196.

As the throttle valve 45 and 47 are opened, pressure will build up through the pilot port 162 in the bore 154 on the opposite side of the piston head 176. Since the areas 198 and 196 are equal, flow from valves 44 or 47 will cause an increase in the pressure on area 198. This in turn will cause the spool 174 to move towards opening 158 in bore 154, when the pilot pressure plus the bias of spring 194 is sufficient to overcome the force acting on surface 196.

The spool 174 will continue to move seat 180 closer to opening 158 in bore 154 until pressure drop through slots 182 is equal to the fluid pressure acting on area 196 less the spring force caused by spring 194. Any further increase in fluid flow through orifice 44 or 46 will cause the spool 174 to move further toward opening 158 closing the flow port between port 160 and port 156. The flow rate through either orifice 44 or 46 will result in spool 174 taking a substantially fixed position with respect to slots 182 and bore 186 and also with respect to opening 158. Therefore, there is an inverse relationship between flow across orifices 44 and 46 and the flow rate between port 160 and port 156.

Figure 7:
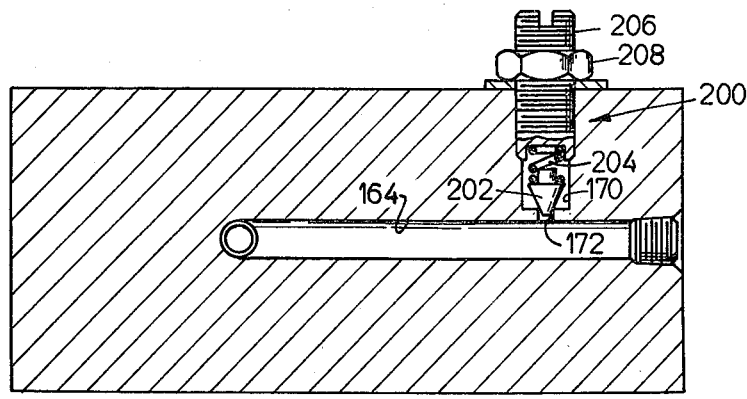
FIG. 7 is a view taken on line 7—7 of FIG. 5 showing a pressure responsive system for the bypass valve.

Means are provided for relieving pressure in the bore 154 whenever the pressure in the pilot port 162 exceeds a predetermined maximum as shown in FIG. 7. Such means is in the form of a relief valve assembly 200 provided in the discharge passage 170. In this regard, the relief valve assembly 200 includes a valve element 202 which is positioned to close the port 172. The valve element 202 is biased by means of a spring 204 into engagement with the orifice 172. The spring 204 is positioned between the valve element 202 and a threaded adjustment screw 206 which is locked in position by a lock nut 208. The relief pressure is determined by the spring force of the spring 204 which can be set by the threaded adjustment screw 206.

when the pressure predetermined by spring 204 and the area of orifice 172 is reached, part of the flow passing through orifice 44 and/or 46 will be diverted from slots 182 and will pass across valve element 202 to tank passage 170. This in turn will cause the spool 174 to valve seat 180 away from opening 158, and allow additional fluid to flow from port 160 to port 156. The valve element 202 will continue to open until spool 174 moves sufficiently away from bore 158 to stabilize the pressure at port 160 at the predetermined level.

Figure 8:
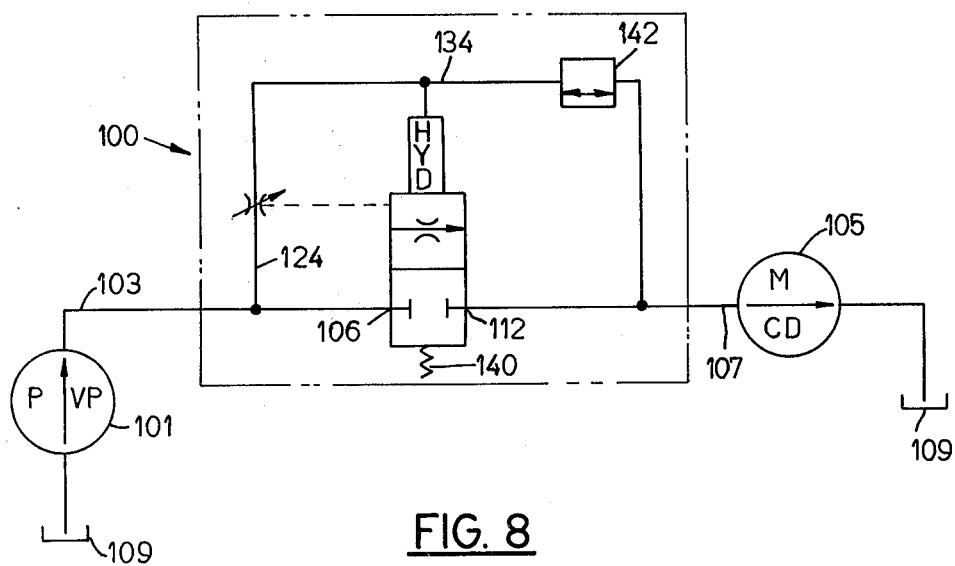
FIG. 8 is a schematic diagram of a hydraulic fluid supply system for a parallel flow type bypass valve.
Figure 9:
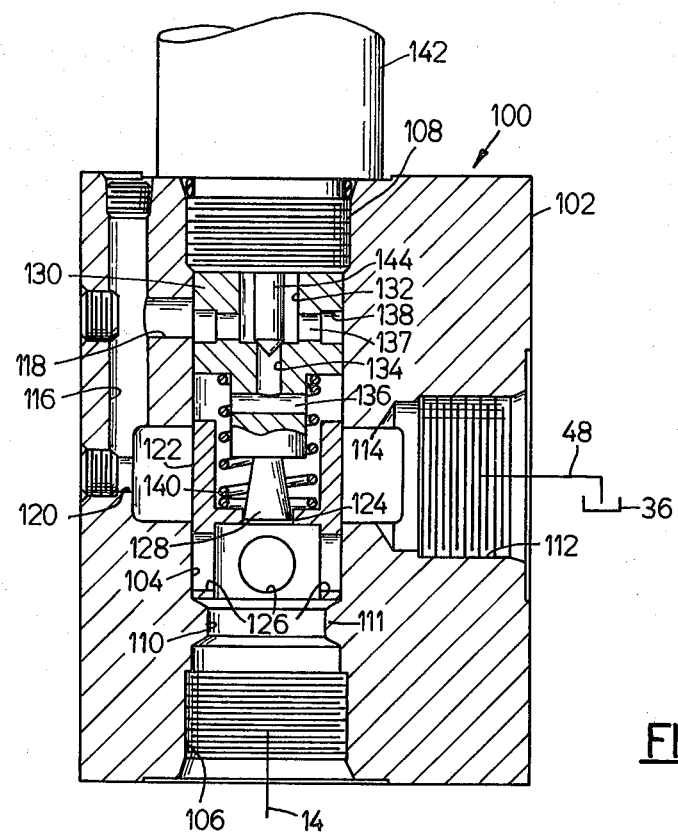
FIG. 9 is a sectional view of the parallel flow type bypass valve useable in the system shown in FIG. 8.
Figure 10:
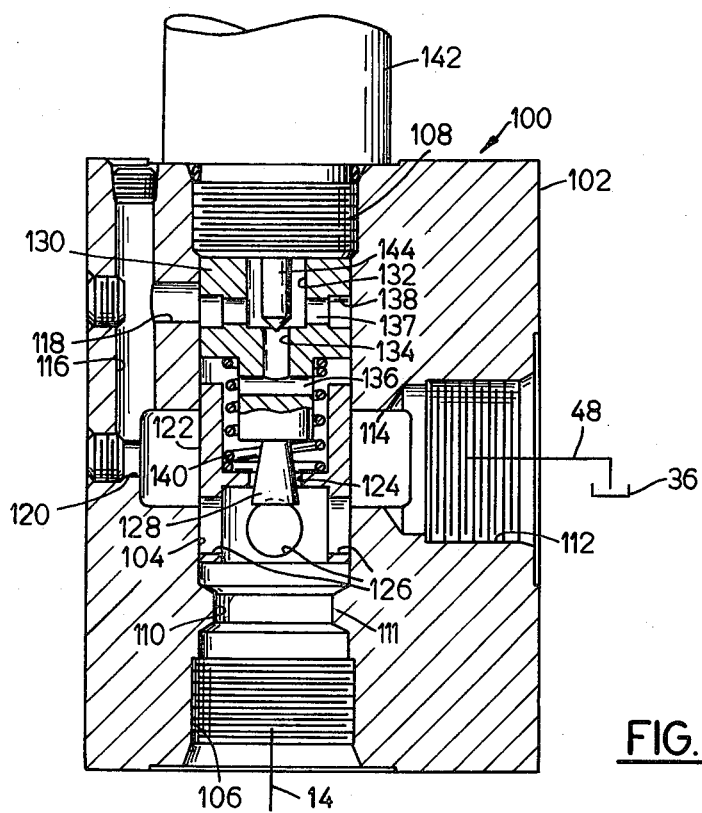
FIG. 10 is a view similar to FIG. 9 showing the valve spool for the parallel flow type valve in the open position.

FIGS. 8, 9 and 10

Referring to FIG. 8, a schematic hydraulic circuit is shown for a bypass valve 100 that provides for full fluid flow to the device being controlled. In this regard a variable displacement pump 101 is shown connected to the valve 100 by a line 103. The valve 100 is used to provide a fixed flow to a motor 105 through a line 107. Both the pump 101 and motor 105 are connected to reservoir 109.

Referring to FIGS. 9 and 10, the proportional flow control valve 100 shown provides a controlled flow rate by means of a variable area orifice controlling a small part of the total flow rate. In a bypass valve of this type, as in the previous bypass valves, a fixed pressure drop is provided by means of the variable area orifice for controlling flow rate.

The valve 100 includes a housing 102 having a bore 104 with a threaded section 106 at one end and a threaded section 108 at the other end. A reduced diameter opening 110 is provided at the end of the threaded section 106 by means of a flange 111. A discharge port 112 is connected to a well 114 which is connected to the bore 104. A passage 116 is connected to the bore 104 through a port 118 and to the well 114 by a port 120.

Flow of fluid from the inlet port 106 through the bore 104 to the outlet port 112 is controlled by means of a valve spool in the form of a tubular piston or member 122 which is mounted for axial movement within the bore 104. The piston 122 includes a reduced diameter section 124 intermediate its ends and a series of holes 126 on one side of the reduced diameter section 124 to meter fluid from bore 104 to port 106.

Control of the flow of pilot fluid through the reduced diameter section 124 is provided by means of a tapered cylinder 128 provided on a fixed member 130 positioned in the bore 104. The member 130 includes a center bore 132 having a reduced diameter passage 134 at its inner end which is connected to the bore 104 through a transverse passage 136. The passage 132 is connected to the port 118 through a transverse passage 137 and an annular groove 138.

Means are provided for biasing the piston 122 toward the reduced diameter flange 111 in the bore 104. Such means is in the form of a spring 140 provided between the reduced diameter section 124 in the piston 122 and the fixed member 130. In the position shown in FIG. 9, the tapered cylinder 128 is positioned to substantially close the opening in the reduced diameter opening of section 124.

Means are provided for controlling the flow of fluid through the passage 134. Such means is in the form of a solenoid control valve assembly 142 threadedly mounted in the threaded section 108 at the end of the bore 104. The assembly 142 includes a valve element 144 which is positioned to block the passage 134. In an alternate arrangement, the solenoid valve can be replaced by a pressure compensating flow control valve making the system pressure compensation or by any metering or throttling type valve.

In operation, fluid enters the bore 104 through the threaded section 106. Fluid pressure acting against the piston 122 moves the piston 122 toward the fixed member 130 against the bias of spring 140. Pressure at port 106 must be sufficient to move piston 122 against the bias of spring 140. Assuming valve 144 is closed, the flow of pilot fluid passing through opening 124 will increase the pressure within the member 122. When the pressure of the pilot fluid in member 122 plus the bias of spring 140 exceeds the pressure of the fluid acting on member 122, the member 122 will close the flow path between port 106 and port 112.

To open the flow path between port 106 and port 112, valve 144 is opened to allow for a pilot flow of fluid through the variable area orifice formed by tapered cylinder 128 and opening 124. As valve 144 moves upward opening the orifice between passage 134 and 132, fluid will flow from bore 104 within cylinder 122 to port 112. This will cause a pressure drop in cylinder 122 sufficient to allow cylinder 122 to move against the bias of spring 140. The cylinder 122 will move upward until the variable area orifice formed by tapered cylinder 128 and bore 124 is sufficiently large to pass fluid at a pilot flow rate substantially equal to the flow rate through passage 134. The movement of cylinder 122 will open the flow path from port 106 through openings 126 to port 112.

If the pressure differential between port 106 and 112 is constant, there will be a fixed relationship between the flow rate through the orifice formed by valve 144 and passage 134 and the flow rate through opening 126. Since the flow rate through passage 134 is determined by the flow rate through the opening 124, the flow rate between port 106 and port 112 will also be substantially equal to the flow rate through opening 124. Since the pressure drop across the variable area orifice formed by the tapered cylinder 128 and opening 124 is fixed or constant, for any finite position of cylinder 122 there will be a known flow rate through the valve. This characteristic of the valve is the same as in all of the other valves.

I claim:

1. A proportional bypass valve comprising a housing having a bore, an inlet port, an outlet port and a pilot port connected to said bore, a valve spool slidably positioned in said bore to control fluid flow from said inlet port to said outlet port, said valve spool having a tapered section at one end of said spool to control the fluid flow rate from said pilot port to said outlet port, a passage through said spool connecting said pilot port to said outlet port, a plug at one end of said bore having a surface facing said bore, a recess in said surface of said plug, said recess having a diameter greater than the diameter of said tapered section on said spool to form a metering land with respect to said tapered section, said tapered section on said spool being positioned for movement into said recess to control the fluid flow rate through the passage in said spool, a spring positioned to bias said spool to a closed position with respect to said inlet port and said outlet port, said spool being movable to an open position connecting said inlet port and said pilot port to said outlet port in response to an increase in fluid pressure in said pilot port, the amount of movement of said spool in said bore being proportional to the flow rate established between said recess in said plug and the tapered section of said spool.

2. The valve according to claim 1 wherein said spring is positioned to bias said tapered section on said spool into engagement with the surface of said plug within said recess to close the passage through said spool.

* * * * *